(12) United States Patent
Luo et al.

(10) Patent No.: US 12,737,468 B2
(45) **Date of Patent: *Sep. 15, 2026**

(54) METHOD AND SYSTEM FOR REDUCING FFT CALCULATIONS IN FHE BOOTSTRAPPING

(71) Applicant: Cornami, Inc., Dallas, TX (US)

(72) Inventors: Fa-Long Luo, Dallas, TX (US); Paul Master, Dallas, TX (US)

(73) Assignee: CORNAMI, INC, Campbell, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/531,169

(22) Filed: Dec. 6, 2023

(65) Prior Publication Data

US 2025/0190570 A1 Jun. 12, 2025

(51) Int. Cl.
*G06F 21/57* (2013.01)

(52) U.S. Cl.
CPC ...... *G06F 21/575* (2013.01); *G06F 2221/034* (2013.01)

(58) Field of Classification Search
CPC .......................... G06F 21/575; G06F 2221/034
See application file for complete search history.

(56) References Cited

U.S. PATENT DOCUMENTS

2018/0253402 A1* 9/2018 Redfern ................. G06N 3/045
2020/0213079 A1* 7/2020 Kreeger ................ G06F 9/3812
2023/0010197 A1* 1/2023 Hsu ........................ G06N 3/063
2023/0097103 A1* 3/2023 Srinivasan ............ G06F 17/142 708/404
2023/0291541 A1* 9/2023 Gupta ..................... H04L 9/008
2023/0421352 A1* 12/2023 Shin ........................ H04L 9/008
2025/0047484 A1* 2/2025 Joye ...................... H04L 9/3026
2025/0167976 A1* 5/2025 Van Beirendonck ... H04L 9/008
2025/0175322 A1* 5/2025 Bourgerie ............... H04L 9/008
2025/0192982 A1* 6/2025 Luo ......................... H04L 9/008

OTHER PUBLICATIONS

Kim et al., "Accelerating Number Theoretic Transformations for Bootstrappable Homomorphic Encryptioni on GPUs." ArXiv preprint arXiv:2012.01968 (Year: 2020).*

* cited by examiner

*Primary Examiner* — Carl G Colin
*Assistant Examiner* — Zhe Liu
(74) *Attorney, Agent, or Firm* — Marisa Whitaker

(57) ABSTRACT

A system and method to reduce fast Fourier transforms (FFT) required for bootstrapping in a Fully Homomorphic Encryption process. Ciphertext is separated into a vector of n samples. A fast Fourier transfer (FFT) is performed over a first vector of the samples and a FFT over a bootstrap key. A phase vector of n W(a) terms that are equivalents to the output of a FFT is calculated. A first set of pointwise multiplications of the FFT of the first vector of samples with each of the n W(a) terms in the phase vector is performed. A second set of pointwise multiplications of the results of the first set of pointwise multiplications with the FFT of the bootstrap key is performed. An inverse FFT(IFFT) on the accumulated result of the second set of point-wise multiplications is performed to obtain a bootstrapping result of the ciphertext.

17 Claims, 11 Drawing Sheets

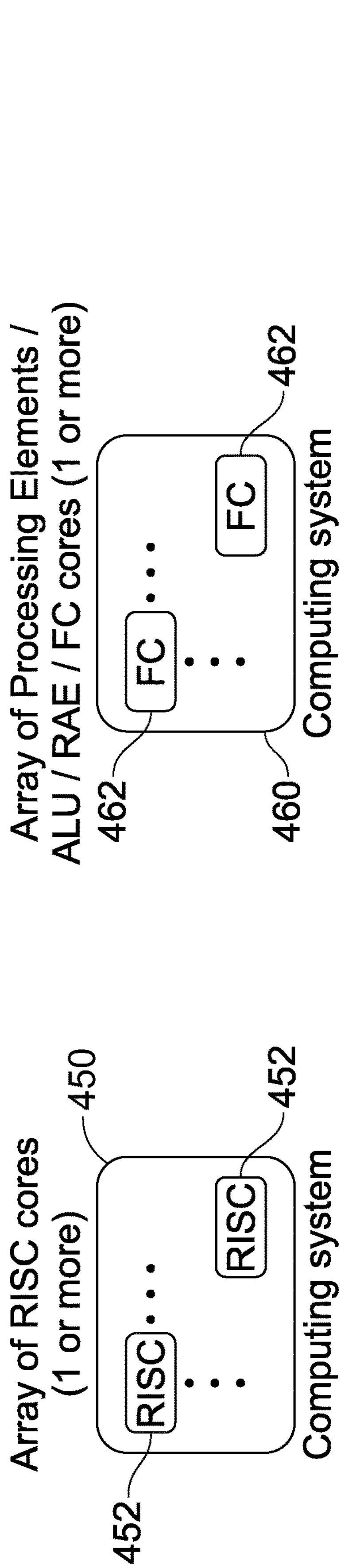
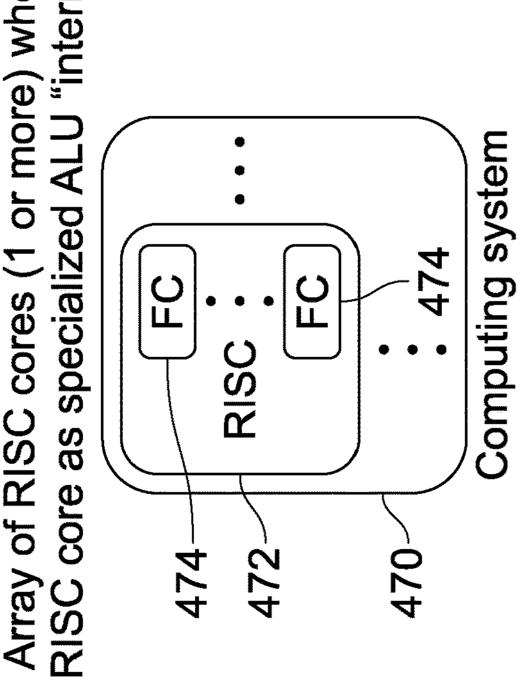
FIG. 4B

500

Typical Values: $N=500$ and Gadget Decomposition Level $\geq 1$

| 510 | No. of FFT | No. of IFFT | Point-Wise Multiplication | Extra Computations | No. of Total Multiplications | Complexity Reduction Ratio |
|---|---|---|---|---|---|---|
| Current Solution | $N\cdot(2\cdot L)$ | $N\cdot(2)$ | $N\cdot(4\cdot L)$ | 0 | $N^2\cdot(2\cdot L+2)\ln(N)+4N\cdot L$ | 1 |
| Current Solution2 | $N\cdot(2)$ | $N\cdot(2)$ | $N\cdot(4\cdot L)$ | 0 | $N^2\cdot 4\ln(N)+4N\cdot L$ | $\frac{2}{L+1}$ |
| Cornami Solution | 2 | 2 | $N\cdot(4\cdot L+1)$ | N (exp-vector) | $N\cdot 4\ln(N)+6N\cdot(L+1)$ | $\frac{2}{N(L+1)}$ |

METHOD AND SYSTEM FOR REDUCING FFT CALCULATIONS IN FHE BOOTSTRAPPING

TECHNICAL FIELD

The present disclosure relates generally to security applications. More particularly, aspects of this disclosure relate to techniques to reduce fast Fourier transform (FFT) computations for bootstrapping for quantum computing proof encryption.

BACKGROUND

Computing systems having homogeneous cores that may be configured for different executing applications have been recently introduced. Thus, such cores may be adapted for many different operations and be purposed for various parallel programming tasks. The cores are typically fabricated on a die. Such dies may be fabricated so they may be divided to allocate the needed processing power. The processing performed by such dies thus relies on many cores being employed to divide programming operations. One example of such division may be a streaming model of programming multiple cores that employs different threads that are assigned to different cores.

Such dies therefore have an array of cores that may be selectively employed for different operations such as for massively parallel processing. One application of dies with a large array of cores may be for security applications such as encrypting and decrypting data. The parallel nature of encryption applications may leverage the configurable nature of the architecture of an array of homogeneous configurable cores.

Currently, encryption techniques relate to public/private key mechanisms that require an intensive level of computing power to brute force solve the encryption. Such systems are currently secure because of the corresponding intensive level of computing power necessary to solve such encryption. However, with the advent of potential quantum computers, standard encryption techniques may be vulnerable to being solved by a quantum computer. Thus, new types of quantum secure encryption have been proposed, such as fully homomorphic encryption (FHE). FHE allows computations on ciphertext without having to perform decryption. This allows delegation of sensitive data analysis computations on encrypted data. Fully Homomorphic Encryption is a concept that encompasses any encryption scheme allowing for arbitrary computation on ciphertexts. Different FHE schemes can be based on various hard mathematical problems. One type of fully homomorphic encryption is the Concrete library that implements the Fully Homomorphic Encryption over the Torus (TFHE) procedure.

The Concrete library is an open-source library developed in Rust that builds on the state-of-art TFHE cryptosystem. The Concrete library provides a user friendly interface making FHE easy to integrate. The Concrete library deals with inputs of arbitrary format and comes with an extensive set of operations for manipulating ciphertexts, including a programmable bootstrapping process. FHE is based on a quantum secure scheme based on solving a complex mathematical problem. One example of this is an FHE based on the learning with errors (LWE) problem. Learning With Errors (LWE) is a quantum robust method of cryptography applicable to FHE that is conjectured to be hard to solve, and thus to be useful in cryptography. The security and functionality of the scheme rely on the difficulty of solving the LWE problem. The FHE allows computations such a Boolean operation on ciphertext without decryption. Thus, sensitive data analysis (computations) may be delegated on encrypted data. The Learning With Errors (LWE) based Fully Homomorphic Encryption (FHE) schemes represent only a subset of the broader category of FHE. There are other mathematical problems and approaches that can be used to construct FHE schemes. For instance, some are based on the hardness of problems related to integer lattices such as LWE, while others might be based on different mathematical structures.

Currently TFHE/Concrete Boolean operations require a series of bootstraps to eliminate noise from the computational routines performed on ciphertext. Bootstrapping is a computationally expensive process that involves performing a large number of fast Fourier transforms (FFT) and inverse fast Fourier transforms (IFFT). Such transforms require a large amount of processing power for the necessary bootstrapping required for FHE supporting operations.

A starting-point case of bootstrapping may be represented by the equation:

$$ACC(i) = ACC(i-1) + (X^{a_i} - 1) \cdot ACC(i-1) \cdot BK_i \quad (1)$$

ACC (i) represents a vector of the bootstrapped data for a TFHE Mux rotation operation using FFT. The second vector, ACC (i−1), is a set of learn with errors (LWE) that is a previous vector. The previous vector is added to the polynomial term $X^{ai}$ and the combined expression is multiplied by the second vector ACC (i−1) and a boot strap key, $BK_i$. The boot strap key is expressed as a matrix because of its large size. For i=1 to 500 (500 samples), FFT operations must be performed for each of the elements of the vector ACC(i). Thus, with FFT operations, the equation may be expressed as:

$$ACC(i) = ACC(i-1) + IFFT[FFT((X^{a_i} - 1) \cdot ACC(i-1))] * FFT(BK_i)) \quad (2)$$

For ACC (500), this equation requires performing 500 FFTs, 500 IFFTs, and 500 point-wise multiplication operations.

FIG. 1 shows a prior art system 10 that performs the bootstrapping operation explained above. In this example 500 learn with error (LWE) samples 42 are input. The input size is thus 501×32/8 or 2 kB. The samples are input to a mod switching 50 that outputs a set of LWE values. A blind rotate circuit 52 representing the ACC equation above accepts the LWE value and RGSW to output a tLWE. The blind rotate circuit 52 performs 500 iterations in this example for each of the samples. The tLWE value is fed into a sample extraction circuit 54 that extracts an LWE. The LWE is fed into a key switching circuit that 56 so as to output the LWE ciphertext whose noise level has been greatly reduced due to the above bootstrapping processing. An example output is a LWE sample having 500 elements.

As explained above the blind rotate circuit 52 performs the above functions expressed in the equations above. The blind rotate circuit 52 is activated 500 times in a loop for each of the 500 elements of such as a LWE value 60 that is output from the mod switching 50 in this example. The blind rotate circuit 52 includes an exponent and negate and add module 62, a vector multiplication module 64, an external product module 66, and an adder 68. The exponent and negate and add module 62 has inputs from the LWE value 60 and an accumulator value from an accumulator 70 that is updated by the blind rotate circuit 52. The exponent and negate and add module 62 outputs a LWE output and a tLWE output that are input into the vector multiplication 64. The resulting output is fed into the external product module 66 that multiplies the input by a bootstrapping key 72. The adder 68 adds the resulting value to the accumulator 70.

The external product module 66 includes a decomposition module 80, an FFT circuit 82, a point wise multiplier 84, and an IFFT circuit 86. The bootstrapping process requires multiple performances of FFT and IFFT operations by the FFT 82 and the IFFT 86 in the external product module 66. In this example, with i being set to 500, the ACC (500) requires 500 FFTs, 500 IFFTs and 500 Point-Wise Multiplications that are performed by the FFT circuit 82, the point wise multiplier circuit 84, and the IFFT circuit 86 for each of the samples. The large number of operations for the bootstrap requires significant computational resources and time and thus impedes efficient encryption.

Thus, there is a need for a bootstrapping process for FHE that minimizes the number of FFT operations. There is a further need for a bootstrapping process that may use a configurable array core to perform repetitive functions.

SUMMARY

One disclosed example is a method to bootstrap ciphertext in a Fully Homomorphic Encryption process. Ciphertext is separated into a vector of n samples. A fast Fourier transfer (FFT) is performed over the vector of the samples. A FFT is performed over a bootstrap key. A phase vector of n W(a) terms is determined. A first set of pointwise multiplications of the FFT of the vector of samples with each of the W(a) terms in the phase vector is performed. A second set of pointwise multiplications of the results of the first set of pointwise multiplications with the FFT of the bootstrap key is performed. An inverse FFT (IFFT) is performed on the accumulated result of the second set of point-wise multiplications to obtain a bootstrapping result of the ciphertext.

Another disclosed example is a method to bootstrap ciphertext in a Fully Homomorphic Encryption process. Ciphertext is separated into a vector of n samples. A fast Fourier transfer (FFT) is performed over the vector of the samples. A FFT is performed for each of n polynomial terms multiplied by a bootstrap key. A point wise multiplication is performed of each of the FFT outputs of the set of FFTs of the polynomial terms and the output of the FFT over the vector of the n samples. The result of the FFT over the vector of the n samples is added to the results of the set of pointwise multiplications. An inverse FFT (IFFT) is performed on the FFT over the vector of n samples and the accumulated results of the point-wise multiplications to obtain a bootstrapping result of the ciphertext.

Another disclosed example is a system to perform bootstrapping in a FHE process. The system includes a first processing core configured to perform a fast Fourier transfer (FFT) on a vector of n ciphertext samples and a bootstrap key. An interconnection network is coupled to the first processing core. A second processing core is coupled to the interconnection network. The second processing core is configured to determine a phase vector of n W(a) terms. A third processing core is coupled to the interconnection network. The third processing core is configured to perform a first set of pointwise multiplications of the FFT of the first vector of samples with each of the W(a) terms in the phase vector. The third processing core is configured to perform a second set of pointwise multiplications of the results of the first set of pointwise multiplications with the FFT of the bootstrap key. A fourth processing core is coupled to the interconnection network. The fourth processing core is configured to perform an inverse FFT (IFFT) on the accumulated result of the second set of point-wise multiplications to obtain a bootstrapping result of the ciphertext.

Another disclosed example is a system to perform bootstrapping in a FHE process. The system includes a first processing core configured to perform a fast Fourier transfer (FFT) on a vector of n ciphertext samples and a bootstrap key. An interconnection network is coupled to the first processing core. A second processing core is coupled to the interconnection network. The second processing core is configured to perform a FFT for each of n polynomial terms multiplied by a bootstrap key. A third processing core is coupled to the interconnection network. The third processing core is configured to perform a set of point wise multiplications of each of the FFT outputs of the FFTs of the polynomial terms and the output of the FFT over the first vector of the n samples. A fourth processing core is coupled to the interconnection network. The fourth processing core is configured to add the result of the FFT over the first vector of the n samples to the results of the set of pointwise multiplications. A fifth processing core is coupled to the interconnection network. The fifth processing core is configured to perform an inverse FFT (IFFT) on the FFT over the first vector of n samples and the accumulated results of the point-wise multiplications to obtain a bootstrapping result of the ciphertext.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 4B is a set of configurations for multiple cores in the example core array in FIG. 3B;

FIG. 5 is a table comparing the reduction in FFT calculations required for bootstrapping in the example method compared with prior art methods;

Figure 1:
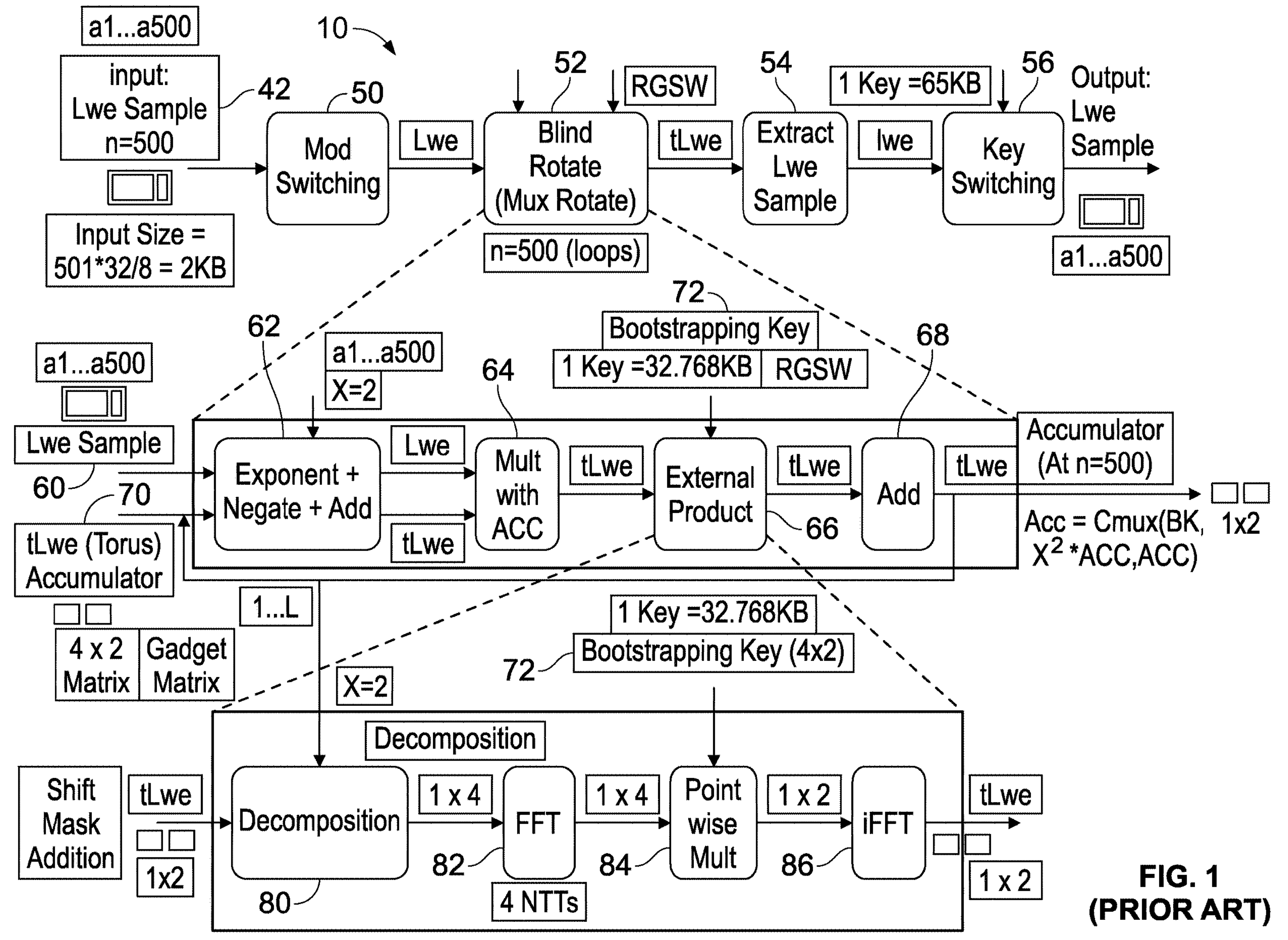
FIG. 1 is a block diagram of a prior art system for performing a bootstrapping routine.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward an example technique for reducing the number of FFT operations required by bootstrapping for an FHE process such as a learning with errors FHE scheme. The example technique is premised on the fact that the bootstrap key, $BK_i$, is a fixed number and thus the FFT for the bootstrap key may be performed off line. By eliminating the FFT routines required for the bootstrap key, the example method reduces the number of FFT and IFFT routines necessary for bootstrapping.

Figure 2A:
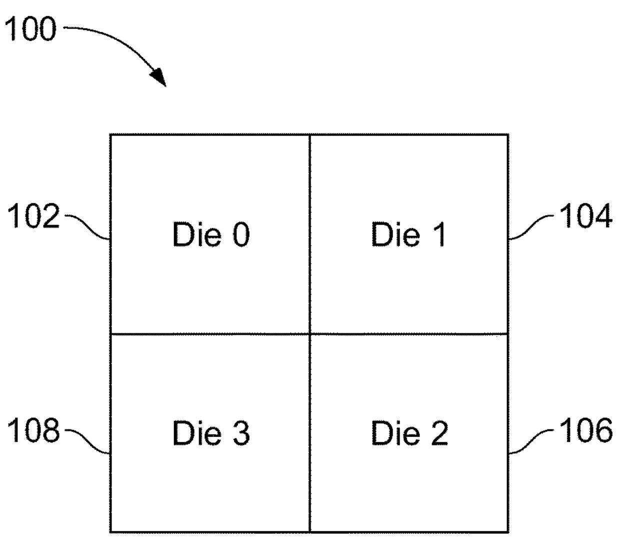
FIG. 2A is a diagram of a chip having four dies each having multiple processing cores.

FIG. 2A shows an example chip 100 that is subdivided into four identical dies 102, 104, 106, and 108. Each of the dies 102, 104, 106, and 108 include multiple processor cores, support circuits, serial interconnections and serial data control subsystems. For example, the dies 102, 104, 106, and 108 may each have 4,096 processing cores as well as SERDES interconnection lanes to support different communication protocols. There are die to die parallel connections between the dies 102, 104, 106 and 108. Thus, each of the dies 102, 104, 106, and 108 in this example are interconnected by Interlaken connections. The chip 100 is designed to allow one, two or all four of the dies 102, 104, 106, and 108 to be used. The pins on a package related to un-used dies are left unconnected in the package or the board. The dies are scalable as additional chips identical to the chip 100 may be implemented in a device or a circuit board. In this example, a single communication port such as an Ethernet port is provided for the chip 100. Of course, other ports may be provided, such as one or more ports for each die.

Figure 2B:
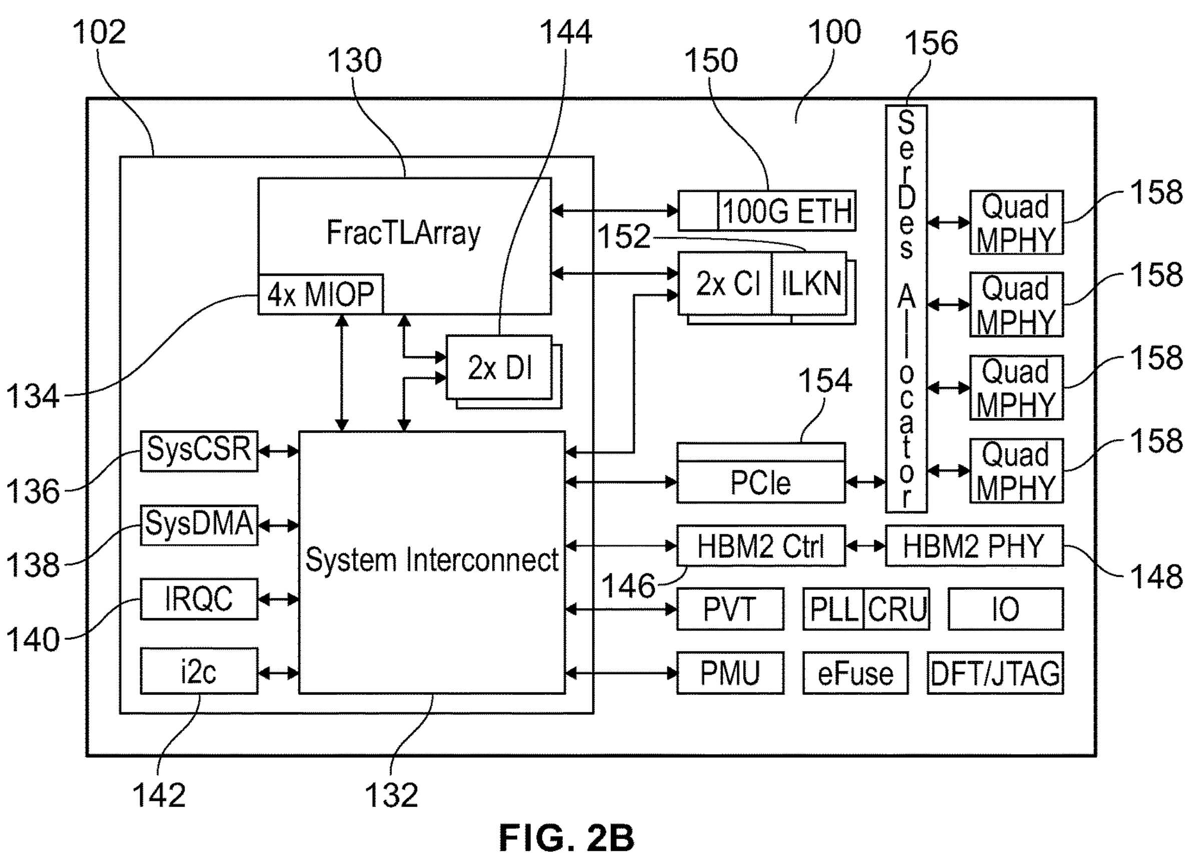
FIG. 2B is a simplified diagram of one of the dies on the chip shown in FIG. 2A.

FIG. 2B is a block diagram of one example of the die 102. The die 102 includes a fractal array 130 of processing cores. The processing cores in the fractal array 130 are interconnected with each other via a system interconnect 132. The entire array of cores 130 serves as the major processing engine of the die 102 and the chip 100. In this example, there are 4096 cores in the fractal array 130 that are organized in a grid.

The system interconnection 132 is coupled to a series of memory input/output processors (MIOP) 134. The system interconnection 132 is coupled to a control status register (CSR) 136, a direct memory access (DMA) 138, an interrupt controller (IRQC) 140, an I2C bus controller 142, and two die to die interconnections 144. The two die to die interconnections 144 allow communication between the array of processing cores 130 of the die 102 and the two neighboring dies 104 and 108 in FIG. 2A.

The chip includes a high bandwidth memory controller 146 coupled to a high bandwidth memory 148 that constitute an external memory sub-system. The chip also includes an Ethernet controller system 150, an Interlaken controller system 152, and a PCIe controller system 154 for external communications. In this example each of the controller systems 150, 152, and 154 have a media access controller, a physical coding sublayer (PCS) and an input for data to and from the cores. Each controller of the respective communication protocol systems 150, 152, and 154 interfaces with the cores to provide data in the respective communication protocol. In this example, the Interlaken controller system 152 has two Interlaken controllers and respective channels. A SERDES allocator 156 allows allocation of SERDES lines through quad M-PHY units 158 to the communication systems 150, 152 and 154. Each of the controllers of the communication systems 150, 152, and 154 may access the high bandwidth memory 148.

In this example, the array 130 of directly interconnected cores are organized in tiles with 16 cores in each tile. The array 130 functions as a memory network on chip by having a high-bandwidth interconnect for routing data streams between the cores and the external DRAM through memory IO processors (MIOP) 134 and the high bandwidth memory controller 146. The array 130 functions as a link network on chip interconnection for supporting communication between distant cores including chip-to-chip communication through an "Array of Chips" Bridge module. The array 130 has an error reporter function that captures and filters fatal error messages from all components of array 130.

Figure 3A:
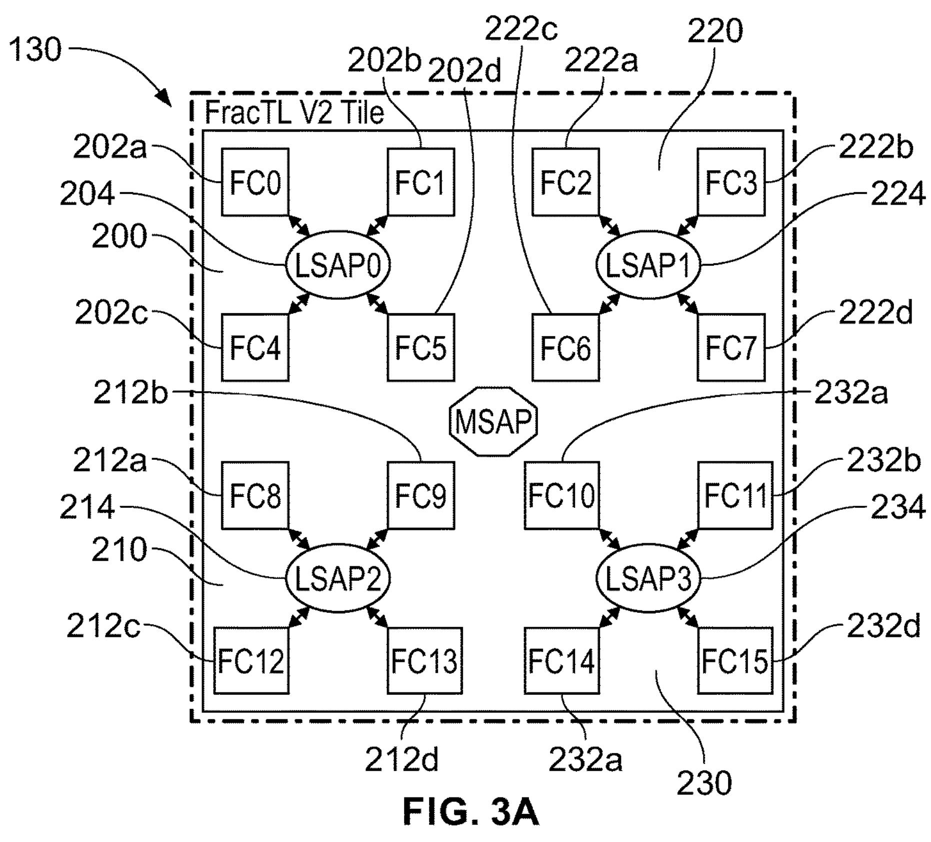
FIG. 3A is a block diagram of the array of cores in the die in FIG. 2B.
Figure 3B:
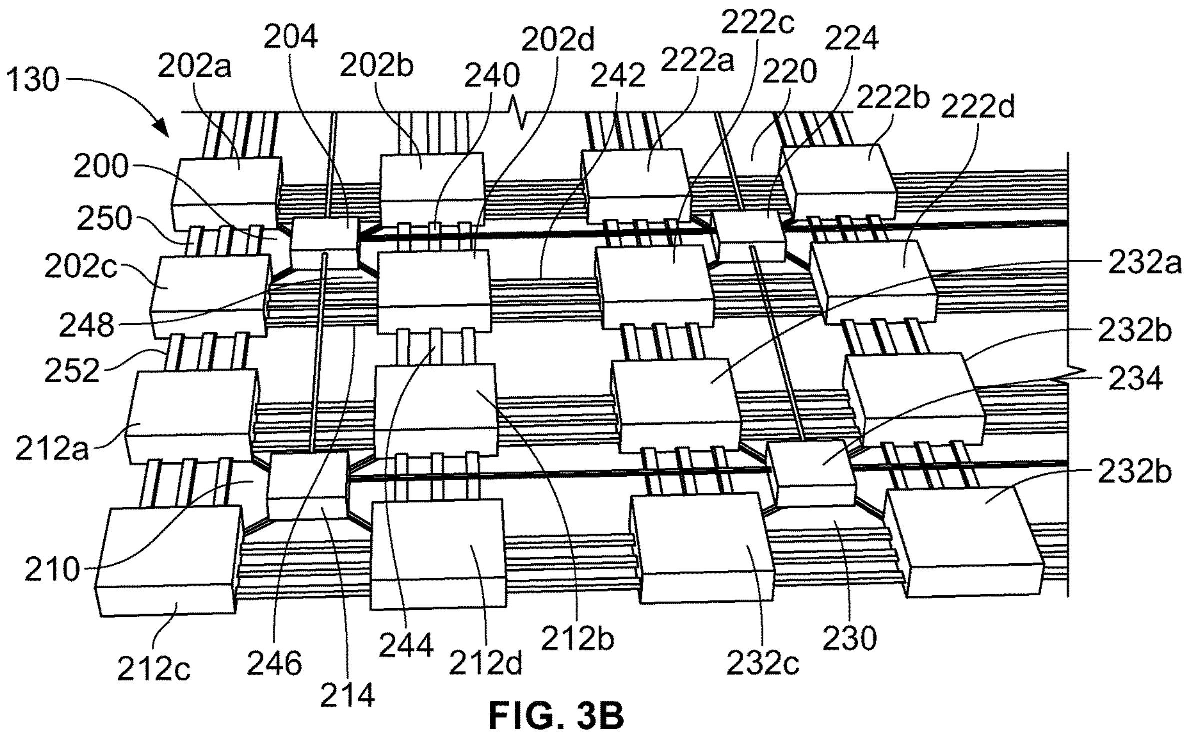
FIG. 3B is a three-dimensional view of the array of cores in the die in FIG. 2B.

FIG. 3A is a detailed diagram of the array of cores 130 in FIG. 2B. FIG. 3B is a three-dimensional image of the array of cores 130 in FIG. 2B. The array of cores 130 is organized into four core clusters such as the clusters 200, 210, 220, and 230 shown in FIG. 3A. For example, the cluster 200 includes cores 202*a*, 202*b*, 202*c*, and 202*d*. Each of the four cores in each cluster 200 such as cores 202*a*, 202*b*, 202*c*, and 202*d* are coupled together by a router 204. FIG. 3B shows other clusters 210, 220, and 230 with corresponding cores 212*a*-212*d*, 222*a*-212*d* and 232*a*-232*d* and corresponding routers 214, 224, and 234.

As may be seen specifically in FIG. 3B, in this example, each of the cores 202*a*, 202*b*, 202*c*, and 202*d* has up to four sets of three interconnections [L, A, R]. For example, a core in the center of the array such as the core 202*d* includes four sets of interconnections 240, 242, 244, and 246 each connected to one of four neighboring cores. Thus, core 202*b* is connected to the core 202*d* via the interconnections 240, core 202*c* is connected to the core 202*d* via the interconnections 242, core 212*b* is connected to the core 202*d* via the interconnections 244, and core 202*c* is connected to the core 202*d* via the interconnectors 246. A separate connector 248 is coupled to the wire router 204 of the cluster 200. Thus, each core in the middle of the array, has four sets of interconnections, while border cores such as the core 202*c* only have three sets of interconnections 250, 252, and 246 that are connected to respective cores 202*a*, 202*d*, and 212*a*.

Figure 4A:
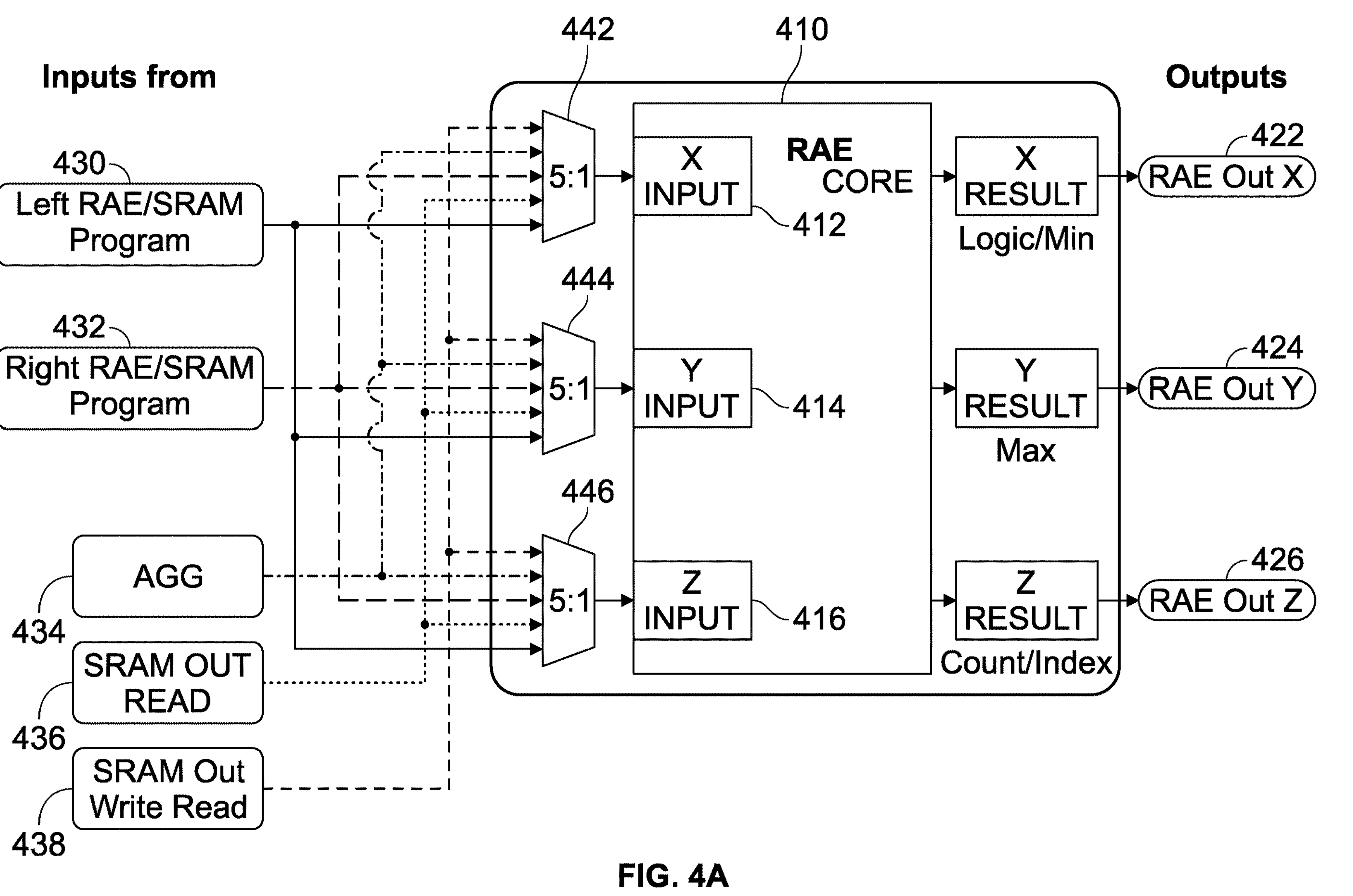
FIG. 4A is a configuration for one of the cores in the example core array in FIG. 3B.

In order to configure the cores of the example array 130 in FIG. 2A, the inputs of certain blocks may be changed to configure blocks for one of the three different function blocks. The functions may be configured by simply changing the inputs of the processing cores. FIG. 4A shows a block diagram of an example processing core 400 that includes a reconfigurable arithmetic engine (RAE) 410. The RAE 410 may be configured and reconfigured to perform relevant mathematical routines such as FFT, IFFT, point wise multiplication and exponential vector functions for the example bootstrapping method. The RAE 410 includes input reorder queues, a multiplier shifter-combiner network, an accumulator and logic circuits. The RAE 410 operates in several modes, such as operating as an ALU, and include a number of floating point and integer arithmetic modes, logical manipulation modes (Boolean logic and shift/rotate), conditional operations, and format conversion. The RAE 410 includes three inputs 412, 414, and 416 and three outputs 422, 424, and 426. The RAE 410 receives the output data from a program executed by another RAE 430 and output data from another program executed by another RAE 432. An aggregator (AGG) 434 provides an output of aggregated data from different sources to the RAE 410. A memory read output 436 and a memory write output 438 also provide data to the RAE 410. The memory outputs 436 and 438 provide access to a memory such as an SRAM that stores operand data, and optionally may also store configurations or other instructions for the RAE 410.

Each of the output data of the RAE 430, RAE 432, aggregator 434, memory read output 436 and the memory write output 438 are provided as inputs to three multiplexers 442, 444, and 446. The outputs of the respective multiplexers 442, 444, and 446 are coupled to the respective inputs 412, 414, and 416 of the RAE 410.

FIG. 4B is a diagram of four configurations 450, 460, 470, and 480 of the array of cores in FIG. 2B as either a RISC-V processor or a specialized ALU internal module. The configurations 450, 460, 470, and 480 can dynamically switch from one type to the other by reconfiguring some or all of the computational cores in the configurations. The first configuration 450 is a set of cores configured as a full RISC processor 452 with associated SRAM able to execute traditional Control Flow programs as a function representing the computation within a dataflow node. In this example, the RISC processor 452 includes sixteen separate cores. Another configuration 460 is sixteen independently reconfigurable and programmable ALUs, that are each cores 462 (termed FracTLcores® available from Cornami in this example). Each of the cores 462 have associated SRAM supporting multiple simultaneous integer and floating point computations of up to 128-bits. The configuration 460 thus is a set of cores that are configured as individual FracTLcores. The configuration 480 has a set of cores that is configured into two individual groupings of cores configured as RISC processors 482 and cores that are configured as ALUs (e.g., FracTLcores) 484. The configuration 470 includes one or more RISC cores 472 that are a set of sixteen cores in this example. The RISC core 772 can have additional individual or multiple FracTLcores 474 incorporated within them to accelerate specific RISC functions. Alternatively, the additional cores 474 may be designated for data path/arithmetic acceleration, enhancing ALU performance. Thus, to implement a standard 64 bit RISC processor such as the RISC-V processor 452 in this example, sixteen cores are configured to become the RISC-V. Optional additional cores may be added to the configuration to provide hardware acceleration to math operations performed by the RISC. For example, a normal RISC processor does not have hardware to perform a cosine function. Thus, an additional core may be added and configured to perform a hardware cosine operation. This enhances the ISA instruction set of the RISC processor by adding the hardware accelerated cosine function that may be accessed by the RISC processor.

This reconfigurable computing architecture in FIGS. 2-4 allows that different functions can also be defined by dynamically changing the topological linkages of processing cores within a computational fabric to achieve superior silicon utilization in terms of application performance, throughput, power consumption, and processing latency. The computational fabric significantly reduces the dependence on memory to store intermediate computational results and exceeds the flexibility and programmability of a Field Programmable Gate Array (FPGA), Digital Signal Processor (DSP), or Graphics Processing Unit (GPU), while still providing near Application-Specific Integrated Circuit (ASIC) level solution performance.

As explained above, the prior art bootstrapping Equation (1) may be mapped to a new equation as follows by performing FFT operations on each term of both sides of Equation (1).

$$\begin{aligned} FFT(ACC(i)) &= \\ &FFT(ACC(i-1)) + FFT((X^{a_i}-1)\cdot ACC(i-1)) * FFT(BK_i) = \\ &FFT(ACC(i-1)) + W(a_i) * FFT(ACC(i-1)) * FFT(BK_i) \end{aligned} \tag{3}$$

A new expression, W(a) is an equivalent of the output of the FFT of $(X^{a_i}-1)$ that eliminates the need to perform an FFT. In the new expression, the $W(a_i)$ at the i'th iteration term that is substituted for the $FFT(X^{a_i}-1)$ term is the M×1 vector (phase vector) whose kth element (frequency bin) is:

$$\exp\left(\frac{-j2k\pi a_i}{N}\right)-1$$

where all donations are the same as those in Equation 1. More specifically, FFT(ACC(i)) and FFT(ACC(i−1)) are the frequency-domain values (the output of FFT operations) of the ACC(i) and ACC(i−1), respectively. $FFT(BK_i)$ are the frequency-domain values (the output of FFT operation) of bootstrapping key at i'th iteration in Equation 3. M is the size of FFT and IFFT.

Unlike the prior art Equation 2 where at each iteration, two FFTs and one IFFT are needed, the example process in Equation 3 just needs two FFT operations only during the initialization stage (i=1) and one IFFT operation only when the entire iteration is complete (i=N). For the rest of the iterations, no FFT or IFFT is needed at all. Hence, the example process in Equation 3 may be considered as near FFT-free bootstrapping. The extra computation of this near FFT-free algorithm for each iteration is the calculation of a M×1 vector: $W(a_i)$, which is an equivalent of the output of a FFT calculation, but whose computational complexity is much less than that for a FFT or IFFT operation. Meanwhile, for both the prior art Equation 2 and the example process in Equation 3, a vector point-wise multiplication is needed for each iteration.

For an example of 500 samples, e.g., i=1 to 500, the determination of bootstrapping result of ACC (500) only needs one FFT, one IFFT, and 1000 point-wise multiplications as well as 500 times calculation of the phase vector $W(a_i)$. In comparison with prior-art Equation (2) where 500 FFTs, 500 IFFTs and 500 point-wise multiplications are needed. Thus, an FFT is performed on both sides of the above equation once. The $W(a_i)$ coefficient is determined initially. In this manner, multiple FFT operations are minimized as only two FFT and IFFT operations are required at the lower computational cost of doubling the number of point-wise multiplications and calculating the $W(a_i)$ coefficient.

A second example technique using an additional FFT step and eliminating the FFT of the bootstrap key also reduces the necessary FFTs. The second example technique performs multiple FFTs first and allows elimination of multiple IFFTs. In the second example technique, the prior art equation may be rewritten as follows:

$$FFT(ACC(i)) = FFT(ACC(i-1)) + FFT\left(\left(X^{a_i}-1\right)\cdot ACC(i-1)\right) * FFT(BK_i) = FFT(ACC(i-1)) + FFT(ACC(i-1)) * FFT((X^{a_i}-1)\cdot BK_i) \tag{4}$$

Thus, the second example technique needs 500 FFTs, one IFFT and 500 point-wise multiplications.

FIG. 5 shows a table 500 that compares the results of the first example technique with currently known techniques for bootstrapping. The table 500 compares the required number of FFTs, IFFTs, and point wise multiplication operations for the prior art bootstrapping, a state of the art prior art technique, and the example technique in respective rows 510, 520 and 530. The table 500 also lists the respective extra computations, total number of multiplications, and complexity reduction ratio. As may be seen in table 500, although the first example technique requires increasing pointwise multiplication operations and certain extra computations, it reduces the total number of computations resulting in the lowest complexity reduction ratio. The first example technique only requires two FFT operations and two IFFT operations, while increasing the required point wise multiplication functions. This is a net decrease in required operations, thus providing a vast improvement in efficiency over the known methods of bootstrapping.

From the above algorithms, there are three different functional blocks which need to be implemented in hardware such as the programmable cores of the array 130 using the configurations explained above in reference to FIGS. 4A-4B. Thus, different blocks are configured to perform FFT/IFFT, point-wise multiplication, and an exponential function vector $W(a_i)$ in order to complete bootstrapping processing in accordance with either of the example techniques.

The example bootstrapping methods may be performed by a suitable processor such as a generic central processor, a Field Programmable Gate Array (FPGA), a Digital Signal Processor (DSP), a Graphics Processing Unit (GPU), or an Application-Specific Integrated Circuit (ASIC). However, the example method may be accelerated by implantation in the core array based system in FIG. 2B, where cores are configured for the three function blocks to perform the respective FFT/IFFT function, point wise multiplication function, and exponential function vector. In one example, the cores in the array 130 in FIG. 2B may be configured for performing cryptographic operations such as encryption of ciphertext that reduces the required FFT operations since the operations are performed multiple times.

Figure 6A:
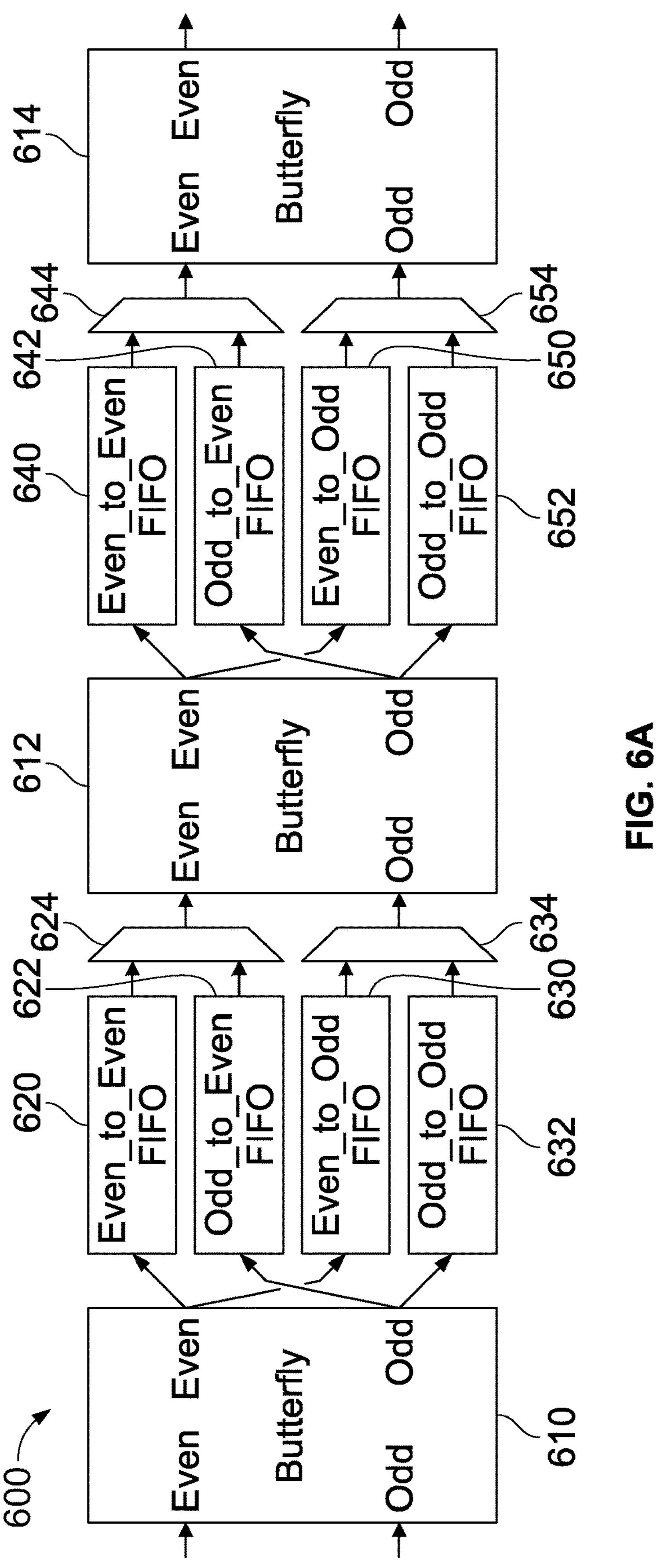
FIG. 6A is a block diagram of cores configured to perform butterfly functions to support FFT operations.
Figure 6B:
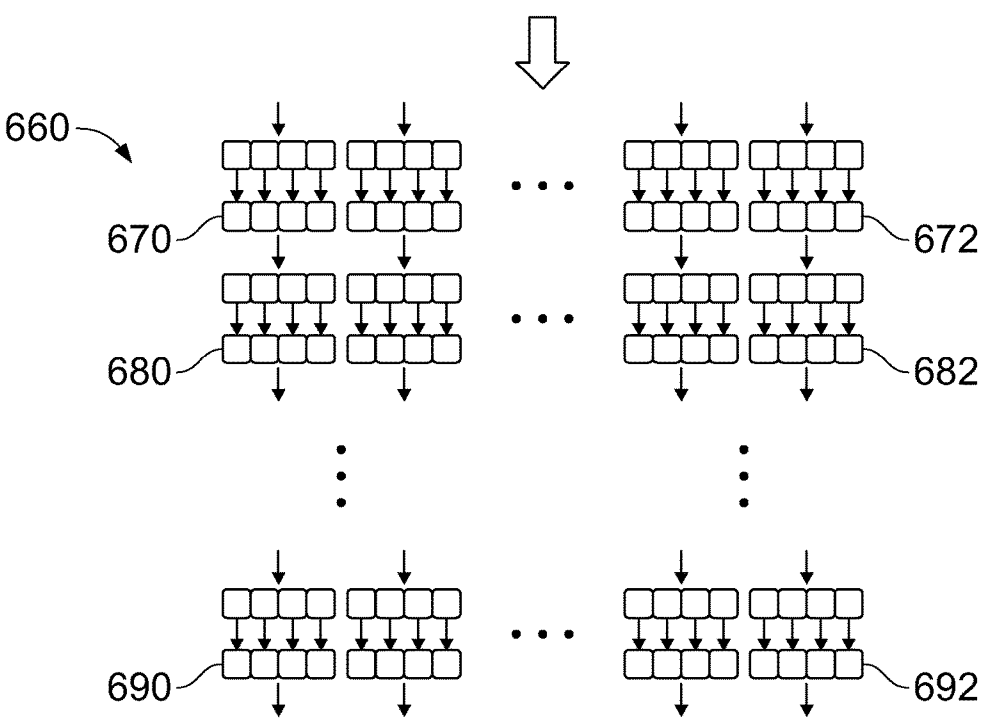
FIG. 6B is a data flow diagram of data that is processed by the cores in FIG. 6A.

FIG. 6A shows the configuration of a radix based FFT implementation 600 as an example. FIG. 6B shows a data flow chart 660 for the FFT implementation 600. In the context of fast Fourier transform algorithms, a butterfly is a portion of the computation that combines the results of smaller discrete Fourier transforms (DFTs) into a larger DFT.

The implementation 600 includes three cores 610, 612, and 614 configured for executing a butterfly computation that combines smaller discrete Fourier transforms. Each input vector is decomposed into an even vector and an odd vector that is input into the first core 610. The first core 610 outputs an even vector and an odd vector that are sent to an even to even FIFO 620 and an odd to even FIFO 622. The outputs of the FIFOs 620 and 622 are sent to a multiplexer 624 that sends an output to the even output of the next core 612. The even vector and odd vector outputs are also sent to an even to odd FIFO 630 and an odd to odd FIFO 632. The outputs of the FIFOs 630 and 632 are sent to a multiplexer 634 that sends an output to the odd output of the next core 612.

The core 612 outputs an even vector and an odd vector that are sent to an even to even FIFO 640 and an odd to even FIFO 642. The outputs of the FIFOs 640 and 642 are sent to a multiplexer 644 that sends an output to the even output of the next core 614. The even vector and odd vector outputs are also sent to an even to odd FIFO 650 and an odd to odd FIFO 652. The outputs of the FIFOs 650 and 652 are sent to a multiplexer 654 that sends an output to the odd output of the next core 614. Thus, FIG. 6B further shows the data flow and the data flow configuration from input to output where each input vector is decomposed into even part and odd part to serve as two inputs of processing units. In FIG. 6B, a configured unit 670 and 672 are the first and the last butterfly computation units of a first butterfly layer, respectively. In this example, configured units 680 and 682 are the first and the last butterfly computation unit of a second butterfly layer, respectively. Configured units 690 and 692 are the first and the last butterfly computation units of the last butterfly layer, respectively. There are in total Mlog(M) butterfly layers if the FFT size is M.

The example computational fabric in the array 130 supports multiple arithmetic formats including double-precision floating point (DP) and fixed-point (FP) formats. Thus, three different implementation formats for performing the three functional blocks of the example methods may be used. The implementation formats include fully double precision floating point where all variables and computations are executed in DP format; fully fixed-point where all variables and computations are executed in FP format; and near fully fixed point where the bootstrapping key is pre-calculated in DP format and then converted to FP for point-wise multiplication.

Figure 7A:
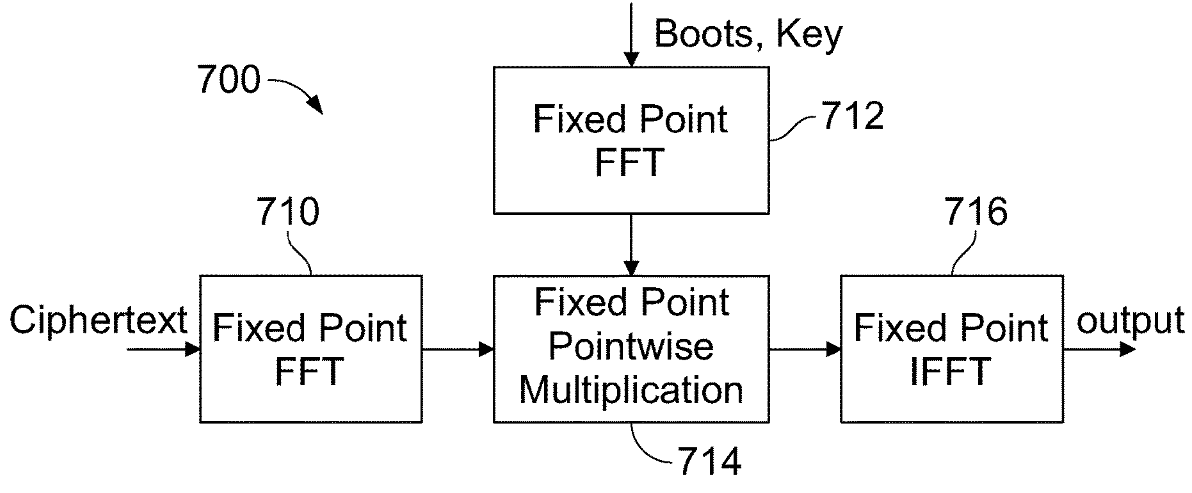
FIG. 7A is a configuration of cores performing a fixed point implementation of the example bootstrapping method.

FIG. 7A shows an example fully fixed point format implementation 700 of the example bootstrapping technique. In the implementation ciphertext is input to a first core 710 that is configured for executing a fixed point FFT. A bootstrap key is input to a second core 712 that is configured for executing fixed point FFT. The output of the first core 710 and the second core 712 is input to a core 714 that is configured to perform fixed point pointwise multiplication of the outputs of the cores 710 and 712. The pointwise multiplication output of the core 714 is input to a core 716 that is configured to perform fixed point IFFT.

Figure 7B:
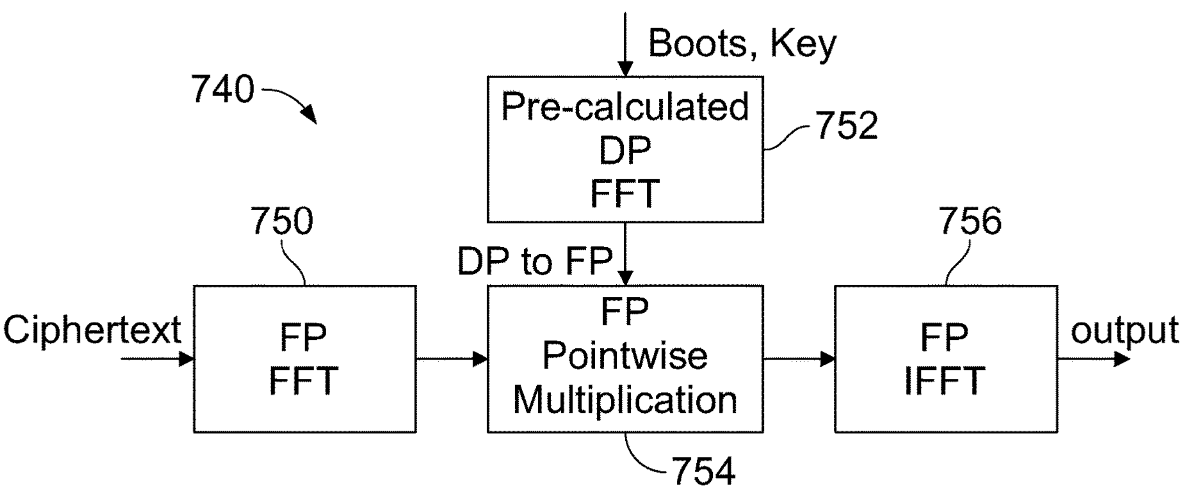
FIG. 7B is a configuration of cores performing a nearly fully fixed point format implementation of the example bootstrapping method.

FIG. 7B shows an example nearly fully fixed point format implementation 740 of the example bootstrapping technique. In the implementation ciphertext is input to a first core 750 that is configured for executing a fixed point FFT. A bootstrap key is input to a second core 752 that is configured for executing a pre-calculated double-precision floating point FFT. The output of the second core 752 is converted from double-precision floating point format to fixed point format. The output of the first core 750 and the converted output of the second core 752 is input to a core 754 that is configured to perform fixed point pointwise multiplication of the outputs of the cores 750 and 752. The pointwise multiplication output of the core 754 is input to a core 756 that is configured to perform fixed point IFFT.

Figure 8A:
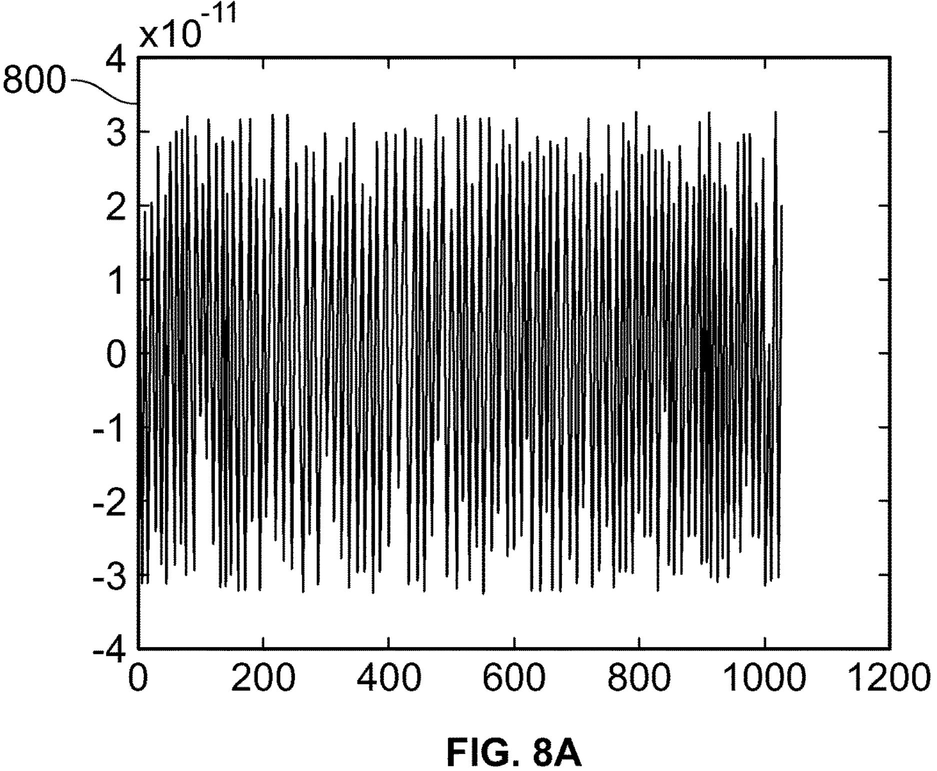
FIG. 8A is a graph showing the results of the example technique in double-precision floating point format.
Figure 8B:
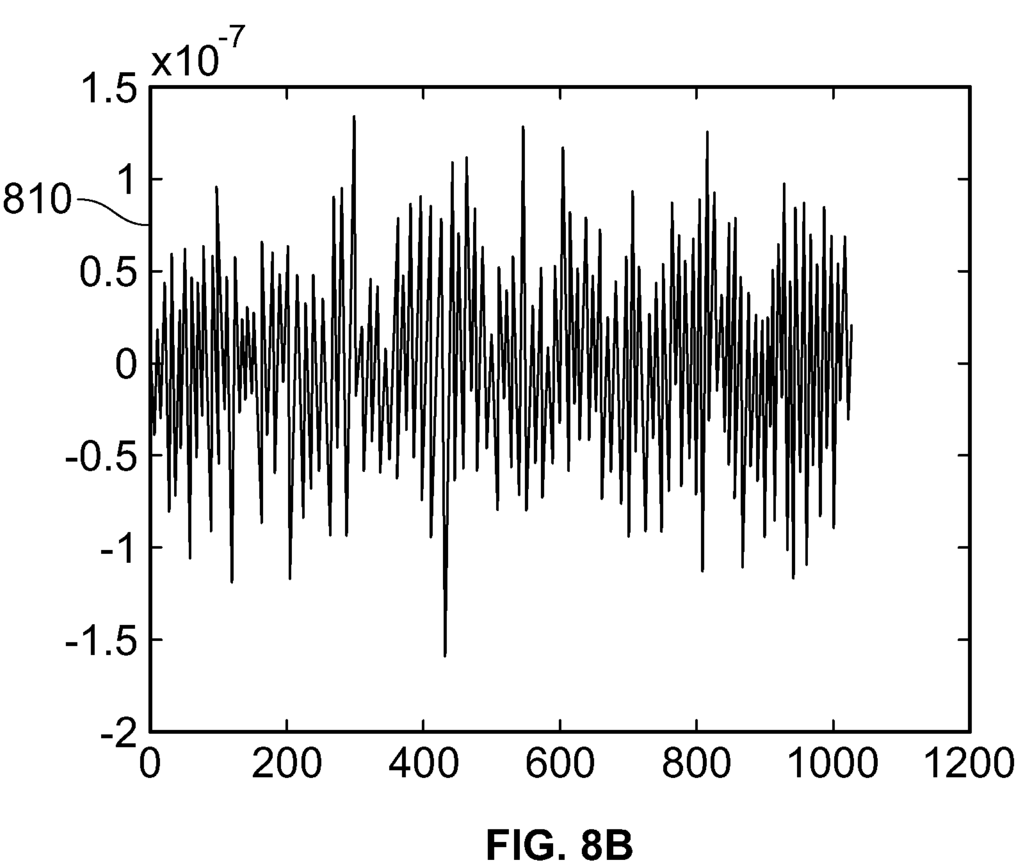
FIG. 8B is a graph showing the results of the example technique in fixed point format.
Figure 8C:
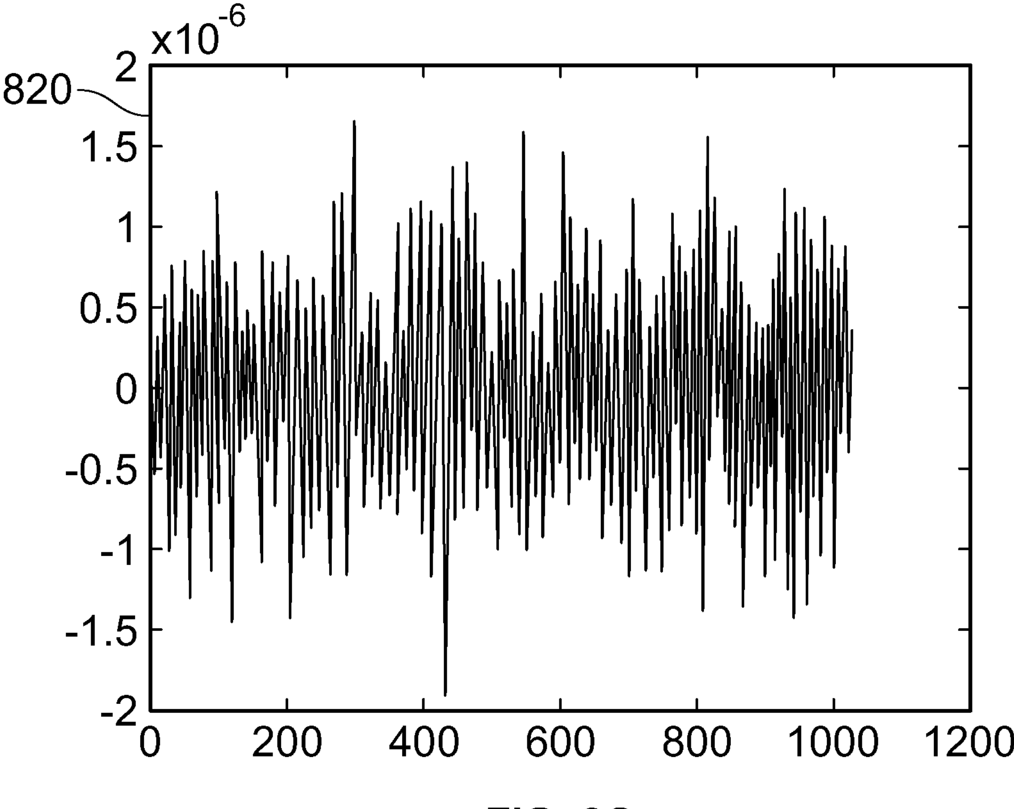
FIG. 8C is a graph showing the results of the example technique in nearly fully fixed point format.

FIG. 8A shows a graph 800 of a plot of the difference between the theoretical value and the result obtained by an implementation such as the implementation 700 in FIG. 7A where all fixed-point operations are replaced by the double-precision floating point format. FIG. 8B shows a graph 810 of a plot of the difference between the theoretical values and the result obtained by an implementation such as the implementation 700 in FIG. 7A that is fully in fixed point format. FIG. 8C shows a graph 820 of a plot of the difference between the theoretical values and the result by an implementation such as the implementation 740 in FIG. 7B that is in nearly fully fixed point format. In the graphs 800, 810 and 820, the X axis represent the sample order (time domain) and the y axis represents the differences between the theoretical value of bootstrapping and the corresponding result by the example implementation in three different formats, namely, fully double-precision floating format, fully fixed-point format and nearly fully fixed-point format. The graphs 800, 810, and 820 in FIGS. 8A-8C show the implementation performance comparisons with the theoretical results of corresponding calculations. All the differences shown in graphs 800, 810 and 820 are less than $1.9\times10^{-7}$, which is small enough to meet the desired error (noise) requirement in bootstrapping operation. Thus, these graphs of implementation results demonstrate the accuracy and effectiveness of the disclosed process.

Figure 9:
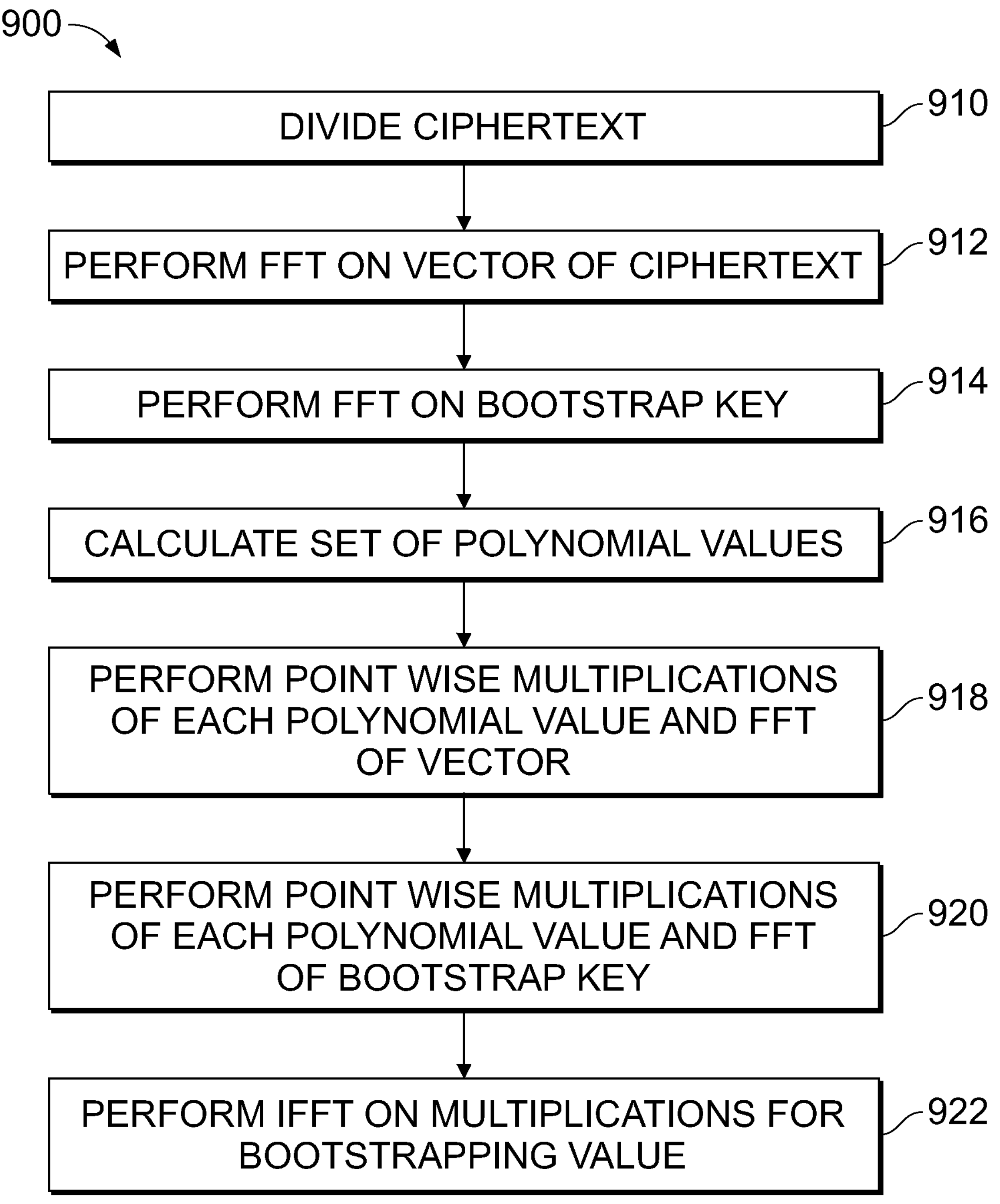
FIG. 9 is a flow diagram of an example routing of bootstrapping according to the example method.

A flow diagram 900 in FIG. 9 is representative of example machine readable instructions for the process of reducing the number of FFTs and IFFTs for performing bootstrapping in FHE Torus encryption using a Concrete library. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 9, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The flow diagram 900 is the routine for performing FHE in Torus with reduced bootstrapping. Encrypted ciphertext is first divided into a set of elements (910). A fast Fourier transform is performed on a vector of the set of elements (912). A FFT is performed for a bootstrap key (914). A set of polynomial variables is calculated for each of the set of elements (916). A first set of pointwise multiplications is performed of the FFT of the first vector of samples with each of the W(a) terms in the vector (918). A second set of pointwise multiplications of the results of the first set of pointwise multiplications with the FFT of the bootstrap key (920). An inverse FFT (IFFT) is performed on the accumulated result of the second set of point-wise multiplications to obtain a bootstrapping result of the ciphertext (924).

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method to bootstrap ciphertext in a Fully Homomorphic Encryption (FHE) computational operation on an input ciphertext, the method comprising:

performing the FHE computational operation on the input ciphertext via a processor to produce an output ciphertext;

separating the output ciphertext into a vector of n samples;

performing a fast Fourier transfer (FFT) over the vector of the samples;

performing a FFT over a bootstrap key;

determining a phase vector of n W(a) terms without performing an FFT for each of the terms of the vector of the samples, wherein the W(a) terms are equivalents of FFT outputs of performing an FFT of each of the terms of the vector of the samples;

performing a first set of pointwise multiplications of the FFT of the vector of samples with each of the W(a) terms in the phase vector;

performing a second set of pointwise multiplications of the results of the first set of pointwise multiplications with the FFT of the bootstrap key; and performing an inverse FFT (IFFT) on an accumulated result of the second set of point-wise multiplications to obtain a bootstrapping result of the output ciphertext.

2. The method of claim 1, wherein all the samples and vector computations are executed in a double precision floating point format.

3. The method of claim 1, wherein all the samples and vector computations are executed in fully fixed point format.

4. The method of claim 1, wherein all the samples and vector computations are executed in a nearly fully fixed point format, wherein the bootstrapping key is pre-calculated in double precision floating point format and converted to fixed point format for the point-wise multiplication.

5. The method of claim 1, wherein the W(a) terms are expressed as:

$$\exp\left(\frac{-j2k\pi a_i}{N}\right) - 1.$$

6. The method of claim 1, wherein the Fully Homomorphic Encryption (FHE) process is performed for a learning with error scheme.

7. The method of claim 1, wherein the steps are performed by at least one of a central processor, a Field Programmable Gate Array (FPGA), a Digital Signal Processor (DSP), a Graphics Processing Unit (GPU), or an Application-Specific Integrated Circuit (ASIC).

8. A system to perform bootstrapping in a Fully Homomorphic Encryption (FHE) computational operation on an input ciphertext, the system comprising:

a processor performing the FHE computational operation on the input ciphertext to produce an output ciphertext;

a first processing core configured to perform a fast Fourier transfer (FFT) on a vector of n ciphertext samples of the output ciphertext and a bootstrap key;

an interconnection network coupled to the first processing core;

a second processing core coupled to the interconnection network, the second processing core configured to determine a phase vector of n W(a) terms, without performing an FFT for each of the terms of the vector of the samples, wherein the W(a) terms are equivalents of FFT outputs of performing an FFT of each of the terms of the vector of the samples;

a third processing core coupled to the interconnection network, the third processing core configured to perform a first set of pointwise multiplications of the FFT of the first vector of samples with each of the W(a) terms in the phase vector; and a second set of pointwise multiplications of the results of the first set of pointwise multiplications with the FFT of the bootstrap key; and a fourth processing core coupled to the interconnection network, the fourth processing core configured to perform an inverse FFT (IFFT) on an accumulated result of the second set of point-wise multiplications to obtain a bootstrapping result of the output ciphertext.

9. The system of claim 8, wherein all the samples and vector computations are executed in a double precision floating point format.

10. The system of claim 8, wherein all the samples and vector computations are executed in fully fixed point format.

11. The system of claim 8, wherein all the samples and vector computations are executed in a nearly fully fixed point format, wherein the bootstrapping key is pre-calculated in double precision floating point format and converted to fixed point format for the point-wise multiplication.

12. The system of claim 8, wherein the W(a) terms are expressed as:

$$\exp\left(\frac{-j2k\pi a_i}{N}\right) - 1.$$

13. The system of claim 8, wherein the Fully Homomorphic Encryption (FHE) process is performed for a learning with error scheme.

14. The system of claim 8, wherein first, second, third, and fourth processing cores are configured as a reduced instruction set processing core.

15. The system of claim 8, wherein the first, second, third, and fourth processing cores are configured as an arithmetic engine.

16. A non-transitory computer readable medium having stored thereon instructions that, when executed by a processor unit, cause the processor unit to:

perform a Fully Homomorphic Encryption (FHE) computational operation on input ciphertext to produce an output ciphertext;

separate the output ciphertext into a vector of n samples;

perform a fast Fourier transfer (FFT) over a first vector of the samples;

perform a FFT over a bootstrap key;

determine a phase vector of n W(a) terms, without performing an FFT for each of the terms of the vector of the samples, wherein the W(a) terms are equivalents of FFT outputs of performing an FFT of each of the terms of the vector of the samples;

perform a first set of pointwise multiplications of the FFT of the first vector of samples with each of the W(a) terms in the phase vector;

perform a second set of pointwise multiplications of the results of the first set of pointwise multiplications with the FFT of the bootstrap key; and perform an inverse FFT (IFFT) on an accumulated result of the second set of point-wise multiplications to obtain a bootstrapping result of the output ciphertext.

17. The medium of claim 16, wherein the processor unit includes a plurality of configurable cores, each of the configurable cores configured to perform at least one of the instructions.

* * * * *